United States Patent Office 3,759,725
Patented Sept. 18, 1973

3,759,725
REFRACTORY ARTICLES FOR USE WITH
MOLTEN FERROUS METALS
William John Steen, Wirral, England, assignor to Morgan
Refractories Limited, Neston, Wirral, England
No Drawing. Filed Aug. 2, 1971, Ser. No. 168,041
Claims priority, application Great Britain, Aug. 7, 1970,
38,234/70
Int. Cl. C04b 35/52, 35/56, 35/70
U.S. Cl. 106—44                                    6 Claims

ABSTRACT OF THE DISCLOSURE

Articles, or parts of articles, which in use are in contact with molten ferrous metals, are made from a mix of silicon carbide particles and more finely-divided alumina, with or without silica additions provided by for example adding clay, the shaped article being fired so that the alumina coats and bonds the silicon carbide particles.

DESCRIPTION

This invention comprises improvements in and relating to refractory articles for use with molten ferrous metals.

It is well understood that refractory articles for use with molten metals, that is articles such as protective sheaths or protection blocks for pyrometry equipment, degassing units, nozzles and stoppers, cut-off gates of melting furnaces, conveyors and holders such as launders, runners and tundishes, moulds and ingot bases, and lances and other components for dipping in molten metal, should have particularly a good resistance to thermal shock and resistance to attack by the molten metal being handled or by its slag. For certain applications a high strength and hardness are also desirable.

Silicon carbide is a refractory material having these desirable qualities but, since it reacts vigorously with molten ferrous metals, the use of silicon carbide for articles which are to be in contact with molten ferrous metal could result in the carbon content of the ferrous metals being increased and in the silicon carbide articles being rapidly corroded. Therefore, when a molten ferrous metal is being handled, the use of silicon carbide for such articles has been carefully avoided.

It is now found, however, that if the articles are made by firing a mixture of silicon carbide with another refractory material which does not react with molten ferrous metal and which is present in a sufficient proportion and has such a particle size as to coat protectively and bond the silicon carbide particles, the articles produced have good thermal shock properties and also good resistance to corrosion by molten ferrous metals.

Accordingly this invention provides a method of manufacturing a refractory article, which in use is to be contacted by a molten ferrous metal, including the step of firing a green form produced from a particulate mixture having as its principal constituents alumina and silicon carbide, the alumina being present in such proportion and having suuch a particle size that in the fired article it coats and bonds the silicon carbide particles.

It is further found that these desirable results are obtained with mixtures containing as principal constituents:

|                  | Percent by weight |
|------------------|-------------------|
| Silicon carbide  | 80–50             |
| Alumina          | 20–50             | the silicon carbide having a larger particle size than the alumina at least a substantial proportion of which should pass a 200 mesh sieve but may be as fine as 10 microns.

Measurable amounts of silicon carbide passing a 200 mesh sieve should be avoided. The presence of larger alumina particles may be accepted provided there are sufficient fine particles to coat the silicon carbide.

The green form of the refractory article may be made by any standard technique such as casting, extrusion or dry pressing, and the green form is fired to sinter the alumina.

In addition to the above constituents, the mixture may be given an increased silica content of up to 10% by weight of the silicon carbide/alumina mix. The added silica may react with alumina to form mullite. A suitable vehicle for the mix for casting or extrusion is water.

Other constituents, which may be present in trace quantities, for example as impurities, without detracting from the stability of the article in use, are silicon, titania and sodium, potassium and calcium oxides.

Apart from being coarser than the alumina, the silicon carbide should preferably not be too fine as the thermal shock resistance decreases with decrease in particle size and the resulting increase in surface area of the silicon carbide increases the risk of oxidation or other reactions and also increases the required proportion of alumina. Preferably the silicon carbide should pass a 4 mesh sieve but not more than 5% should pass a 120 mesh sieve.

Too close packing of the particles in the article, which may be due to the use of too fine particles or due to excessive pressures in producing the green form prior to firing, should preferably be avoided, but the packing should also not be such as to give an apparent porosity of the finished article of more than about 25%, an apparent porosity of about 21–22% being preferred.

The apparent porosity is that attributable to open pores at the surface of the finished article.

EXAMPLES

A mixing for casting in a plaster mould is prepared with water from a mix having the following composition:

Silicon carbide A percent by weight, substantially all of which passes an 8 BSS sieve and is retained on a 120 BSS sieve, Alumina B percent by weight, all of which has a particle size less than 10 microns, and Clay C percent by weight, the clay being formed of equal parts of ball clay and china clay and having a composition consisting of 5 parts by weight alumina, 6.5 parts silica and 1 part impurities, and substantially all particles passing a 300 BSS sieve.

After casting in the plaster mould, the green form so produced is dried and then fired at between 1200° C. and 1500° C., preferably 1350° C. The resulting article has the silicon carbide bonded together and coated by alumina.

| Ex. 1: | Percent |
|--------|---------|
| A      | 75      |
| B      | 15      |
| C      | 10      |
| Ex. 2: |         |
| A      | 65      |
| B      | 25      |
| C      | 10      |
| Ex. 3: |         |
| A      | 55      |
| B      | 45      |
| C      | 0       |

In each case a deflocculant was added, the amount being 0.1% by weight of the total weight of the mix.

In a test, blocks formed in accordance with these examples were immersed in superheated oxidised steel at 1620° C. for six hours. At the end of this period, there had been no measurable pick-up of carbon or silica by the steel.

I claim:

1. A method of manufacturing a refractory article which in use is to be contacted by molten ferrous metal, which method comprises the steps of:
   (i) forming a particulate mix comprising by weight 80% to 50% silicon carbide and 20% to 50% alumina, the silicon carbide having a particle size to pass a 4 mesh BSS sieve but to be retained by a 200 mesh BSS sieve, and the alumina having a particle size less than 10 microns,
   (ii) preparing a green form from said particulate mix, and
   (iii) firing the green form at a temperature between 1200° C. and 1500° C. to sinter the particles together and the alumina forms a protective coat on the silicon carbide particles and binds them together.

2. A method according to claim 1, wherein the mix comprises also up to 10% clay, the clay comprising equal parts of ball clay and china clay and having a particle size substantially wholly to pass a 300 mesh BSS sieve.

3. A method according to claim 2, wherein the mix consists essentially of 65% silicon carbide, 25% alumina and 10% clay.

4. A method according to claim 1, wherein the mix consists essentially of 55% of silicon carbide having a particle size to be retained substantially wholly by a 120 mesh BSS sieve and 45% alumina.

5. A method according to claim 1, wherein the mix consists essentially of 80% to 50% silicon carbide, 20% to 50% alumina, and, optionally, up to 10% clay.

6. A refractory article manufactured by the method of claim 1.

References Cited
UNITED STATES PATENTS

| | | | |
|---|---|---|---|
| 1,546,833 | 7/1925 | Geiger | 106—65 |
| 3,230,100 | 1/1966 | Davies et al. | 106—65 |
| 3,321,321 | 5/1967 | Abrecht et al. | 106—57 |
| 3,538,205 | 11/1970 | Gates, Jr. et al. | 264—61 |

ALLEN B. CURTIS, Primary Examiner

M. L. BELL, Assistant Examiner

U.S. Cl. X.R.

106—65